Patented Dec. 23, 1952

2,623,055

UNITED STATES PATENT OFFICE 2,623,055

KETENE DERIVATIVES OF STEROIDS AND PROCESS OF MAKING THEM

John B. Rust, Verona, N. J., assignor, by direct and mesne assignments, of one-half to Montclair Research Corporation, Montclair, N. J., a corporation of New Jersey, and one-half to Ellis-Foster Company, a corporation of New Jersey No Drawing. Application December 16, 1950, Serial No. 201,247

4 Claims. (Cl. 260—397.5)

The present invention relates to steroidal ketenes and to the process of making same. In particular it relates to derivatives of 3(β) hydroxy-bisnorcholenic acid.

One of the objects of this invention is the preparation of useful steroidal intermediates by a simple process. Another object is the preparation of steroidal intermediates which may be, easily and in good yield, converted into pregnene derivatives which may be used directly as hormones or may be further converted into hormonal compounds. Still another object is the production of intermediates which may be converted into androstene derivatives.

Further objects of this invention will become apparent from the more detailed description given hereinafter. Such detailed description should not be construed as limiting the invention in any way, but only by way of illustration.

The present invention comprises the production of a ketene

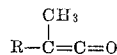

where R represents the tetraalicyclic ring structure of the steroid series, the linkage to the ketene group being at the carbon atom numbered 17 according to the conventional system of numbering the carbons of sterols. For example, it comprises the conversion of 3(β) acetoxy bisnorcholenyl chloride into 3(β) acetoxy-Δ5-androstenyl methyl ketene as is illustrated by the following conventional structural formulas:

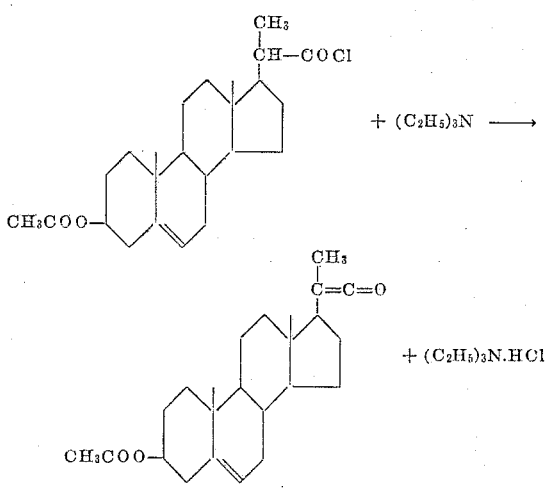

Although I have illustrated this invention by utilizing 3(β) acetoxy bisnorcholenyl chloride, and triethylamine, it may be seen by those skilled in the art that other derivatives of bisnorcholenyl halides and bisnorcholanyl halides may be used. Furthermore, other tertiary amines may be employed with similar results. On the other hand certain circumstances, the ketene may be produced by heat alone (pyrolysis) without the use of a tertiary amine. As the steroidal bisnorcholenyl halide and bisnorcholanyl chloride, I may use: 3-hydroxy-Δ4-bisnorcholenyl chloride, 3-acetoxy-Δ5-bisnorcholenyl bromide, Δ4-3-ketobisnorcholenyl chloride, 3-acetoxy-bisnorcholanyl bromide, 3 - acetoxy - 11 - keto-bisnorcholanyl chloride, 3,11-diacetoxy bisnorcholanyl chloride and the like. If an amine is employed, I may use: trimethyl amine, triethyl amine, tripropyl amine, triisopropyl amine, tri-n-butyl amine, triamyl amine, and the like.

The reaction is preferably carried out in an inert, non-reactive solvent. In some cases it is preferable to employ a solvent which is low-boiling and of high vapor pressure, so that it may easily be removed at low temperature in order to isolate the ketene for further reaction.

In general the ketenes of the present invention are extremely reactive and are somewhat difficult to isolate for purposes of identification. However, their reactions and reaction products are unequivocal evidence of their formation. For instance, after isolation and removal of the anion hydrochloride from the reaction solution of the ketene will undergo the typical ketene reaction with alcohol to form the ester of the starting bisnorcholenic or bisnorcholanic acid.

I have found, moreover, that these steroidal ketenes undergo several reactions which make them extremely valuable intermediates for the formation of pregnene, pregnone, androstene and androstane derivatives. Since the ketenes of the present invention are produced in excellent yield of from 85% to 100% of the theoretical yield, they offer a very attractive route for large scale commercial synthesis of steroidal hormones of the pregnene, androstene and adrenal cortical series.

For instance, using 3-acetoxy-Δ5-bisnorcholenyl chloride as an illustration, I may convert this into 3-acetoxy-Δ5-androstenyl methyl ketene by the process of the present invention. This ketene then gives 3-acetoxy-Δ⁵-pregnene-20-one in good yields upon ozonization, as follows:

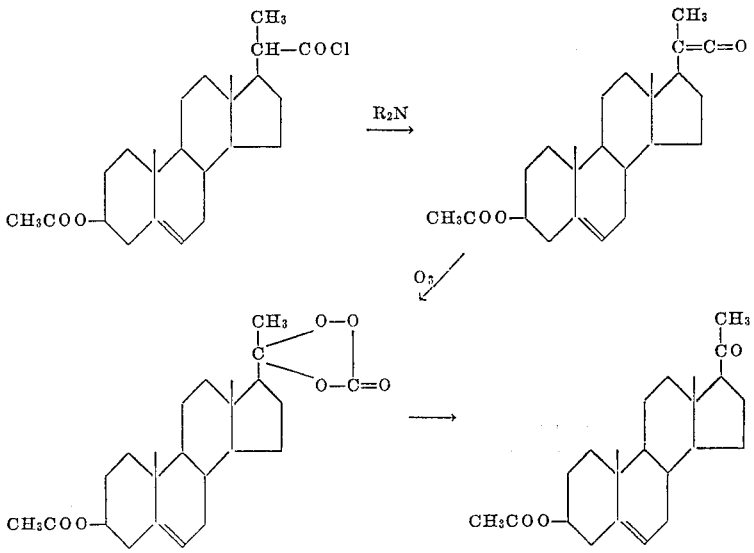

As another instance, I have found that these steroidal ketenes are capable of adding halogens or retracting with phosphorus pentahalides to form α-halo acid halides which are difficult to secure by any other route. These α-halo acid halides are obtainable in excellent yield and lend themselves to further reactions which are valuable in the synthesis of steroidal compounds.

Again using 3-acetoxy bisnorcholanyl chloride as an illustration, I may convert this into 3-acetoxyandrostanyl methyl ketene by the process of the present invention. This ketene then adds bromine to form 3-acetoxy-20-bromo-bisnorcholanyl bromide, as follows:

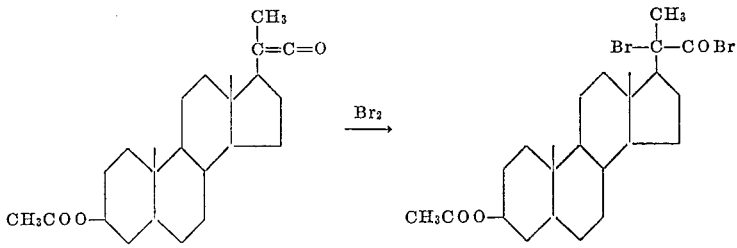 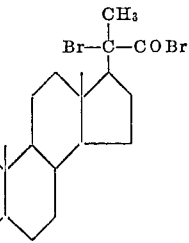

The following examples will serve to better illustrate the present invention, but are not intended to limit the scope thereof in any way.

*Example 1.*—5.0 gms. of Δ⁵-3(β)acetoxy bisnorcholenic acid were suspended in 100 ml. of anhydrous ether and 3 ml. of freshly distilled thionyl chloride added along with 1 drop of pyridine. The suspension was stirred at room temperature while protecting it from moisture. The acid went into solution and was allowed to stand for about 1½ hours. The ether was then removed under vacuum with gentle heating, dry benzene and hexane were added and distilled off under vacuum, leaving a crystalline mass of Δ⁵-3-acetoxybisnorcholenyl chloride. This was then dissolved in 200 ml. of anhydrous benzene containing 1.6 gms. of freshly distilled dry triethyl amine. Almost immediately a white finely-divided precipitate began to form. The solution was allowed to stand overnight and then filtered under anhydrous conditions, and the salt washed with anhydrous ether. There were obtained 1.5 gms. of triethyl amine hydrochloride, representing a yield of 85% of Δ⁵-3-acetoxyandrostenyl methyl ketene.

After removing a small quantity of the solution and adding absolute methanol, and heating to complete the reaction, the solvent was removed under vacuum and the residue recrystallized from methanol. There was obtained a crystalline product, M. P. 138° C., which did not depress the melting point of pure methyl Δ⁵-3-acetoxy bisnorcholenate.

The remaining solution was evaporated under high vacuum at room temperature, the residue was dissolved in chloroform and a stream of oxygen containing 5.4% ozone was passed through the solution cooled at 0° C. for 10 minutes. The chloroform was evaporated under vacuum at room temperature and the residue dissolved in glacial acetic acid and ether. 2 gms. of zinc dust was added and the solution shaken for 15 minutes. The clear solution was decanted from excess zinc, more ether added and diluted with water. The ether extract was washed with water, dilute sodium bicarbonate solution and water. After evaporation of the ether, the residue was crystallized from n-hexane to give a material M. P.=144°–146° C. which did not depress the melting point of an authentic sample of Δ⁵-pregnene-3(β)ol-20-one acetate. It will be noted above that it was not necessary to protect the Δ⁵ bond during ozonization.

*Example 2.*—1.67 gms. of 3(β)acetoxy-Δ⁵-bisnorcholenyl chloride were dissolved in 60 ml. of dry benzene and 1.0 gm. of dry, freshly distilled triamyl amine were added. The solution was allowed to stand at room temperature for 10 hours, after which it was filtered under anhydrous conditions to yield triamylamine hydrochloride, which weighed 0.943 gms. after washing with anhydrous ether and drying. This represents an 87% yield of 3(β)acetoxy-Δ⁵-androstenyl methyl ketene.

An aliquot portion of the solution yielded methyl - Δ⁵-3(β)acetoxy bisnorcholenate when reacted with absolute methanol.

I claim:
1. Compounds of the following general formula:

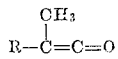

in which R stands for the tetraalicyclic ring structure of the steroid series, the linkage to the ketene group being at $C_{17}$.

2. $\Delta^5$-3($\beta$) acetoxy androstenyl methyl ketene.

3. The process of making a ketene of the general formula

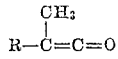

in which R stands for the tetraalicyclic ring structure of the steroid series, the linkage to the ketene group being at $C_{17}$, which comprises reacting an acid chloride having the general formula

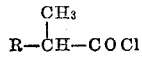

in which R has the significance shown immediately above, with an aliphatic tertiary amine in an inert solvent at ordinary temperature.

4. Process of making $\Delta^5$-3($\beta$) acetoxy androstenyl methyl ketene comprising reacting $\Delta^5$-3($\beta$) acetoxybisnorcholenyl chloride with a tertiary amine in an inert solvent at ordinary temperature.

JOHN B. RUST.

REFERENCES CITED

The following references are of record in the file of this patent:

UNITED STATES PATENTS

| Number | Name | Date |
| --- | --- | --- |
| 2,268,169 | Sauer | Dec. 3, 1941 |
| 2,369,919 | Sauer | Feb. 20, 1945 |
| 2,383,863 | Heuter | Aug. 28, 1945 |